United States Patent [19]

Moedritzer

[11] 4,073,829
[45] Feb. 14, 1978

[54] PHOSPHORUS FLAME RETARDANT COMPOSITIONS

[75] Inventor: Kurt Moedritzer, Webster Groves, Mo.

[73] Assignee: Monsanto Company, St. Louis, Mo.

[21] Appl. No.: 695,702

[22] Filed: June 14, 1976

[51] Int. Cl.$^2$ .............................................. C08L 67/02
[52] U.S. Cl. ................................. 260/860; 106/15 FP; 106/16; 106/177; 260/45.7 P; 260/75 P; 260/870; 526/2
[58] Field of Search ................. 260/75 P, 860, 45.7 P, 260/870, 77.5 AR, 857 R, 78 SC; 526/2; 106/15 FP, 177, 16

[56] References Cited

U.S. PATENT DOCUMENTS

| | | | |
|---|---|---|---|
| 3,406,224 | 10/1968 | McDonough | 260/75 P |
| 3,925,303 | 12/1975 | Rio | 260/45.7 P |
| 3,927,231 | 12/1975 | Desitter et al. | 260/75 P X |
| 3,941,752 | 3/1976 | Kleiner et al. | 260/75 P |
| 3,987,008 | 10/1976 | Stackman | 260/860 X |

*Primary Examiner*—Lucille M. Phynes
*Attorney, Agent, or Firm*—Herman O. Bauermeister

[57] ABSTRACT

The present invention relates to phosphorus-containing compositions which are polymeric esters having flame retardant properties and also a process for the production thereof, as well as the combinations of such phosphorus compositions with otherwise combustible base materials exemplified by various organic polymers, for example polyamides or polyesters.

The phosphorus compositions of the present invention are polymeric esters having as moieties thereof, (A) an aliphatic alcoholic moiety of an alcoholic reactant of 5 to 20 carbon atoms, and from 2 to 10 or preferably 2 to 6 hydroxyl functional groups, with the proviso that there is no hydrogen atom on the carbon atoms which are beta to the hydroxyl oxygen, (B) a moiety of a phosphorus-containing acid halide, ester or amide reactant of 0 to 20 carbon atoms, and having from 1 to 4 functional groups selected from the group consisting of halogen, ester (—OR) and amide (—NR$_2$) groups, where R is an aliphatic radical of 1 to 6 carbon atoms, and (C) a different alcoholic moiety as defined in (A) or a different phosphorus-containing moiety as defined in (B), the said ester having a degree of molecular aggregation of 2 to 100, and with each of (A), (B) and (C) being present at from 1 mole to 99 mole %, with the proviso that the number of alcoholic functional groups on the alcoholic reactants is equal to the number of the said functional groups on the phosphorus-containing reactants.

2 Claims, No Drawings

PHOSPHORUS FLAME RETARDANT COMPOSITIONS

BACKGROUND OF THE INVENTION

The present invention relates to flame retardant compositions which are phosphorus-containing esters, and which are particularly adapted to prevent crystallization and exuding or oiling out when these compositions are employed in organic polymers. Esters of various types have been employed as flame retardant components of various polymers. However, a common difficulty when using such esters has been the incompatibility of the ester with the organic polymer base material, for example, polyamides such as nylon, for example nylon 6,6. The additive esters have sometimes crystallized after a period of time, or have been exuded out of the polymer so that the desired flame-retardant modifying effect on the organic polymer was lost.

The present polymeric esters are ternary compounds which are formed from alcohol components and phosphorus-containing acid halides, esters or amides. The polymeric esters have at least three of the alcohol and phosphorus moieties in the product. Control of the relative proportions of the alcohol and of the phosphorus moieties as well as the relative molecular weight of the starting materials and of the final polymeric esters makes it possible to obtain products having properties of solubility, melting point and crystallization temperature to provide flame retardant properties and other physical properties without the difficulties of exuding or crystallization.

SUMMARY OF THE INVENTION

In accordance with the present invention a process of esterification is employed to form new phosphorus esters having a total of at least three different alcohol and phosphorus-containing moieties: (A) an aliphatic alcoholic moiety of an alcoholic reactant of 5 to 20 carbon atoms, and having from 2 to 10 hydroxyl functional groups, preferably from 2 to 6, with the proviso that there is no hydrogen atom on the carbons which are beta to the hydroxyl oxygen, (B) a moiety of a phosphorus-containing acid halide, ester or amide reactant of 0 to 20 carbon atoms, and having from 1 to 4 functional groups selected from the group consisting of halogen, ester, (-OR) and amide ($-NR_2$) groups where R is an aliphatic radical of 1 to 6 carbon atoms, and (C) a different alcoholic moiety as defined in (A) or a different phosphorus-containing moiety as defined in (B), the said ester having a degree of aggregation of 2 to 100.

The table below shows typical alcohol and phosphorus moieties from representative reactants. The esterifiable groups described above are bonded at the valences shown for the respective compounds.

| Aliphatic Alcohol Component (A) | |
|---|---|
| $-OCH_2-C(CH_3)_2-CH_2O$ | 2-functional (e.g. neopentyl glycol moiety) |
| $CH_3-C(CH_2O-)(CH_2O-)CH_2$ | 3-functional (e.g. trimethylolethane moiety) |
| $C(-OCH_2)(-OCH_2)(CH_2O-)(CH_2O-)$ | 4-functional (e.g. pentaerythritolmoiety) |
| $(-OCH_2)(-OCH_2)(-OCH_2)C-CH_2-O-CH_2-C(CH_2O-)(CH_2O-)(CH_2O-)$ | (6-functional) (e.g. dipentaerythritol moiety; and higher oligomeric forms such as polypentaerythritol, also containing the tri and tetra forms). |

| Phosphorus Component (B) | |
|---|---|
| $R_2P(O)-$ | mono-functional (e.g. dimethylphosphinyl moiety) |
| $RP(O)\langle$ | 2-functional (e.g. chloromethylphosphonyl moiety) |
| $(O)P\langle$ | 3-functional (e.g. phosphoryl moiety) |
| $\rangle P(O)CH_2P(O)\langle$ | 4-functional (e.g. bis(phosphonyl) methane moiety) |
| $R_2P-$ | mono-functional (e.g. diphenylphosphino moiety) |
| $RP=$ | 2-functional (e.g. methylphosphinidene moiety) |
| $P\equiv$ | 3-functional (e.g. phosphinidyne moiety) |

Each of (A), (B) and (C) are present at from 1 mole % to 99 mole %, with the proviso that the number of alcoholic groups on the alcoholic reactants is equal to the number of the said functional groups on the phosphorus-containing reactants.

The aliphatic alcohol component of the polyesters is characterized by the absence of hydrogen atoms on the β-carbon atoms (relative to the hydroxyl groups). This has been found to result in products which are "elimination stabilized" so that the esters do not decompose readily upon heating. Products not so characterized, upon heating, form olefins and acids of phosphorus which latter acids break down and degrade organic polymers with which such ester products have been admixed for flame retardancy.

The alcohol and the phosphorus-containing compounds may be substituted by halogens such as bromine or chlorine. The phosphorus-containing compounds may also be employed as the sulfur analogues, e.g. $PSCl_3$ instead of $POCl_3$.

A representative polymeric structure is shown below, based upon the reaction of $CH_3C(CH_2OH)_3$, $C_6H_5POCl_2$ and $OPCl_3$.

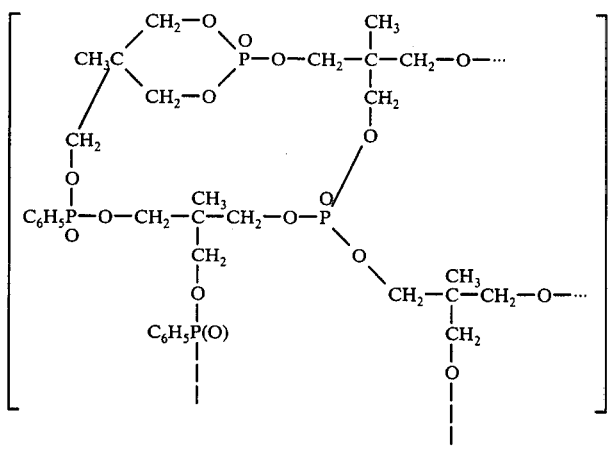

The process for the preparation of the present ternary esters is conducted in the temperature range of 50° to 250° C. Control of the proportions of the (A), (B) and (C) components permits controlling the physical properties of the product. A solvent is not essential, but a non-reactive solvent such as benzene, toluene, octane, or decaline may be employed. The use of a catalyst is also optional; if desired magnesium chloride or an organic base, e.g. piperidine, pyridine, piperazine, or picoline accelerate the rate of reaction.

The products of the present invention are useful as flame retardants for otherwise combustible organic polymers. For this purpose the ester compounds may be applied as a solution to shaped or formed polymeric objects such as films, fibers, extruded and foamed products utilizing a solvent system such as alcohol, e.g. ethanol, or acid amides such as dimethylformamide. The esters can also be admixed with the molten organic polymer or a solution of such polymers in a solvent, before extrusion from spinnerettes to form fibers.

The invention also includes the combination of an organic polymer such as a polyester or a polyamide together with the above phosphorus-containing polymeric ester. The invention also includes copolymers such as block copolymers of the above organic polymers together with the present polymeric esters, such as are obtained by ester interchange. The end groups can be an hydroxyl group or a halogen. However the terminal phosphorus may have groups permitting ester interchange, and interpolymer formation with the organic polymer such as polyethylene terephthalate.

The compounds of the present invention are useful in fire-retardant materials. The method of testing fire-retardant properties is A.S.T.M. Designation D 2863-70, entitled "Standard Method of Test for Flammability of Plastics Using the Oxygen Index Method."

In the Oxygen Index (OI) testing procedure the relative flammability of a plastic material such as nylon, or polyethylene terephthalate is determined by measuring the minimum concentration of oxygen in a slowly rising mixture of oxygen and nitrogen that will just support combustion. Consequently the oxygen index expresses such minimum concentration of oxygen, expressed as volume percent, in a mixture of oxygen and nitrogen that will just support combustion.

The test is conducted by burning the material in a test column which is a heat resistant glass tube of 75mm minimum inside diameter and 450 mm minimum height. At the bottom of the tube is a bed of glass beads about 100mm deep to mix and distribute the gas mixture. Within the glass tube used as the test column there is a specimen holder to support the treated plastic material, while the apparatus is supplied with oxygen and nitrogen flow and control devices. The apparatus is also provided with an igniter which is a separate tube through which a combustible gas such as natural gas is used to ignite the test specimen. In the present testing program glass scrim supported molded sheets of nylon or polyethylene terephthalate ca. 0.2mm thick and about 25mm by 100mm in size are used as the test specimens which are prepared from nylon or polyethylene terephthalate powder and 1% to 20% by weight of the fire retardant additive; the data in the present work correspond to about 10% relative to the total mixture. Upon molding of the organic polymer, e.g., nylon or polyethylene terephthalate, and the additive, an intimate admixture or melt of the molecules of the components is obtained.

In conducting the test, the specimen is clamped in the holder in the test column after which the desired initial concentration of oxygen is introduced to the ignited specimen. A number of tests are conducted to determine the minimum concentration of oxygen that will just support combustion.

The present polymeric esters are useful in combination with organic polymers or resins generally to reduce combustibility. The normally flammable organic polymers which are rendered flame retardant in accordance with the invention may be natural or synthetic but are preferably a solid synthetic polymer, more preferably a nylon or ester type polymer. Examples of the polymer are cotton, wool, silk, paper, natural rubber, and paint, and also the high molecular weight homopolymers and copolymers of amides, e.g., (nylon 66 and nylon 6). Other polymers include esters such as polyethylene terephthalate; and polymers of other unsaturated aliphatic and aromatic hydrocarbons, e.g., ethylene, propylene, butylene, styrene, etc.; and also acrylic polymers, e.g., polyacrylonitrile, polymethyl methacrylate, alkyd resins, as well as cellulose derivatives, e.g., cellulose acetate, methyl cellulose, etc. Still other polymers include epoxy resins, furan resins, isocyanate resins such as polyurethanes, melamine resins, vinyl resins such as polyvinyl acetate and polyvinyl chloride, resorcinol resins, synthetic rubbers such as polyisoprene, polybutadiene-acrylonitrile copolymers, butadiene-stryrene polymers, butyl rubber, neoprene rubber, ABS resins and mixtures thereof. Since the compositions of the invention are unusually effective flame retardants they are normally combined in flame retarding proportions with the organic polymer at relatively low concentrations, e.g., about 1-20 wt.%, preferably about 3-15% based on the weight of the total mixture. The additive is incorporated by physical mixing, by milling, or by impregnation, e.g., from a water or alcohol dispersion or solution, or by dissolving or dispersing in the molten polymer before extrusion such as in the form of fibers or sheets. It should be noted that it is within the scope of the invention to incorporate such ingredients as dyes, pigments, stabilizers, antioxidants, antistatic agents and the like into the novel compositions.

The following examples are illustrative of the invention but are not limitative of the claims of the present patent application.

EXAMPLE 1

The use of dipentaerythritol as the alcohol component is shown in the present example, while the phosphorus components are phosphorus oxychloride and chloromethylphosphonic dichloride. The chemical reaction vessel is charged with 25.9 grams of dipentaerythritol (0.1 mole). This reactant is slurried into 250 ml of toluene and heated to reflux while stirring under a nitrogen atmosphere. The phosphorus components, 0.1 mole of $POCl_3$ and 0.15 mole $ClCH_2POCl_2$, in the respective amount of 15.4 grams and 25.1 grams are added slowly to the reaction mixture in the presence of 0.5 grams of pyridine as a catalyst. The reaction temperature is about 80° C for a period of 24 hours, after which the precipitated polymeric ester is removed by filtration and washed with toluene, followed by drying at 100° C under vacuum. The ester does not support combustion, is insoluble in water, chloroform, dimethylformamide and toluene.

The present ester has the formula

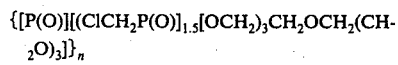

$\{[P(O)][(ClCH_2P(O)]_{1.5}[OCH_2)_3CH_2OCH_2(CH_2O)_3]\}_n$ where $n$ is about 20. The polymer does not support combustion and improves the flame retardancy of organic polymers such as nylon. The use of this product as a flame retardant improves the flame retardancy of polyethylene terephthalate.

EXAMPLE 2

The present example employs trimethylol ethane and pentaerythritol as alcoholic moieties with phosphorus oxychloride according to the equation shown below to prepare an ester:

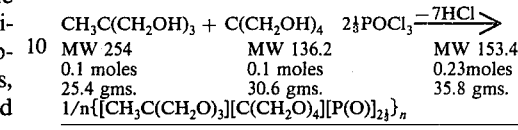

| $CH_3C(CH_2OH)_3$ | + $C(CH_2OH)_4$ | $2\frac{1}{3}POCl_3$ $\xrightarrow{-7HCl}$ |
|---|---|---|
| MW 254 | MW 136.2 | MW 153.4 |
| 0.1 moles | 0.1 moles | 0.23 moles |
| 25.4 gms. | 30.6 gms. | 35.8 gms. |
| $1/n\{[CH_3C(CH_2O)_3][C(CH_2O)_4][P(O)]_{2\frac{1}{3}}\}_n$ | | |

A chemical reaction vessel is charged with the above components, together with 0.5 grams of magnesium chloride as a catalyst, and 250 ml of toluene as a solvent. The reaction is conducted at about 110° C for a period of 3 hours with the dropwise addition of the phosphorus oxychloride. Further heating is continued until evolution of hydrogen chloride diminishes, and the supernatent liquid gives a negative test for chloride. A white product is removed by filtration and is then washed with toluene to obtain a white powder as a 100% yield of the ester, which begins melting at about 240° C.

The ester, with $n$ about 5 as the degree of aggregation, does not support combustion and is useful as a flame retardant component with polyurethanes.

EXAMPLE 3

The production of a three-component phosphorus-containing ester from two different alcoholic components, namely pentaerythritol and neopentylglycol and using phosphorus oxychloride as the phosphorus component is carried out in accordance with the equation shown below:

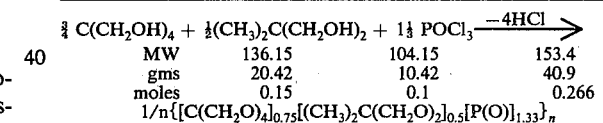

| $\frac{3}{4} C(CH_2OH)_4$ | + $\frac{1}{2}(CH_3)_2C(CH_2OH)_2$ | + $1\frac{1}{3} POCl_3$ $\xrightarrow{-4HCl}$ |
|---|---|---|
| MW | 136.15 | 104.15 | 153.4 |
| gms | 20.42 | 10.42 | 40.9 |
| moles | 0.15 | 0.1 | 0.266 |
| $1/n\{[C(CH_2O)_4]_{0.75}[(CH_3)_2C(CH_2O)_2]_{0.5}[P(O)]_{1.33}\}_n$ | | | |

The two alcoholic components are charged to a reaction vessel together with 250 ml of toluene and 0.5 grams of pyridine. The reaction mixture is brought to reflux temperature at about 110° C and the phosphorus oxychloride diluted to 250 ml with toluene is slowly added. After a 3 hour reaction period, the supernatant liquid is checked as being free of chlorine and hydrogen chloride evolution is completed. The product is removed from the reactor and dried in a desiccator giving a product which is composed of colorless hard crystals softening at 60° C. The use of the above product in the flame retardancy test gives an Oxygen Index of 25 with polyethylene terephthalate as the organic polymer (a control test without additive is about 19 O.I.)

EXAMPLE 4

The use of two different phosphorus-containing components is shown in the present example which proceeds according to the equation below:

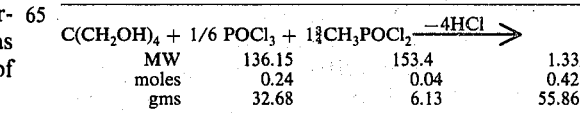

| $C(CH_2OH)_4$ | + $1/6 POCl_3$ | + $1\frac{3}{4}CH_3POCl_2$ $\xrightarrow{-4HCl}$ |
|---|---|---|
| MW | 136.15 | 153.4 | 1.33 |
| moles | 0.24 | 0.04 | 0.42 |
| gms | 32.68 | 6.13 | 55.86 |

-continued $$1/n\{[C(CH_2O)_4][P(O)]_{0.17}[CH_3P(O)]_{1.75}\}_n$$

The pentaerythritol is charged into a reaction kettle together with 250 ml of toluene and 0.5 grams of piperidine. After the mixture is heated to refluxing temperature at about 110° C the two phosphorus components are slowly added in a solution of 250 ml of toluene. The heating is continued until HCl evolution diminishes and the supernatent liquid shows only a trace of chlorine. The crystalline product is removed by filtration and washed with toluene and subsequently dried under vacuum. The product has an initial melting point of 85° C.

The above phosphorus ester when employed in a flame retardancy test gives an Oxygen Index of 23 when employed to the extent of 10% by wt. of the total composition in polyethylene terephthalate.

EXAMPLE 5

Using the procedure of Example 1, but with the use of different proportions of the reactants of the previous example the reaction is conducted according to the equation below:

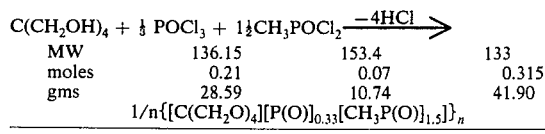

|  | $C(CH_2OH)_4$ | + ½ $POCl_3$ | + 1½$CH_3POCl_2$ $\xrightarrow{-4HCl}$ |
|---|---|---|---|
| MW | 136.15 | 153.4 | 133 |
| moles | 0.21 | 0.07 | 0.315 |
| gms | 28.59 | 10.74 | 41.90 |

$$1/n\{[C(CH_2O)_4][P(O)]_{0.33}[CH_3P(O)]_{1.5}\}_n$$

An esterification kettle is charged with the alcoholic component dissolved in 250 ml of toluene, with 0.5 grams of pyridine. The mixture is heated to reflux at about 110° C after which slow addition is commenced of the two phosphorus components dissolved in 250 ml of toluene. The reaction is continued until only a slight trace of chloride is observed in the off-gas and in the supernatant liquid. The solvent product is separated by decantation, filtration and washing. The product of $n = 10$ degree of aggregation begins melting at 70° C, and when used in the flame retardancy test, has an Oxygen Index of 23 when used at 10 wt. % based upon the total modified polymer, polyethylene terephthalate.

EXAMPLE 6

The use of a halogen substituted alcohol material as one of the components is shown in the present example which employs the equation shown below:

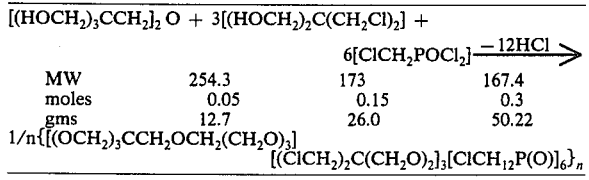

|  | $[(HOCH_2)_3CCH_2]_2$ O | + 3$[(HOCH_2)_2C(CH_2Cl)_2]$ + |  |
|---|---|---|---|
|  |  | 6$[ClCH_2POCl_2]$ $\xrightarrow{-12HCl}$ |  |
| MW | 254.3 | 173 | 167.4 |
| moles | 0.05 | 0.15 | 0.3 |
| gms | 12.7 | 26.0 | 50.22 |

$$1/n\{[(OCH_2)_3CCH_2OCH_2(CH_2O)_3][(ClCH_2)_2C(CH_2O)_2]_3[ClCH_{12}P(O)]_6\}_n$$

The two alcohols are charged into an esterification kettle with 250 ml of toluene as a solvent and 0.5 grams of pyridine. The reaction mixture is heated to 110° C and slow addition started of the phosphorus acidic component dissolved in 250 ml of toluene over a period of about 3 hours. The reaction is continued until hydrogen chloride evolution ceases, after which the solid product is removed. When admixed with polyethylene terephthalate as a 10% additive by wt., the Oxygen Index is 24-24.5.

EXAMPLE 7

This example shows the preparation of a polymeric phosphorus ester, proceeding according to the equation below:

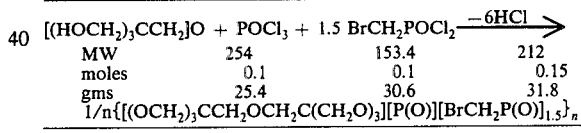

|  |  |  |  |
|---|---|---|---|
|  | HOCH$_2$\ /CH$_2$OH |  |  |
|  | HOCH$_2$—C—CH$_2$—O—CH$_2$—C—CH$_2$OH + |  |  |
|  | HOCH$_2$/ \CH$_2$OH |  |  |
|  | 2$CH_3POBr_2$ + $C_6H_5POBr_2$ $\xrightarrow{-6HBr}$ |  |  |
| MW | 254 | 222 | 284 |
| moles | 0.1 | 0.2 | 0.1 |
| gms | 25.4 | 44.4 | 28.4 |

$$1/n\{[(OCH_2)_3CCH_2OCH_2C(CH_2O)_3][CH_3P(O)]_2[C_6H_5P(O)]\}_n$$

The dipentaerythritol is charged with 250 ml of toluene and 0.5 grams of pyridine into a chemical reaction vessel and brought to 110° C. After bringing the reaction mixture to the reflux temperature, slow addition is commenced of the methyl phosphonic and phenylphosphonic dibromides dissolved in 250 ml of toluene. The reaction is continued until hydrogen bromide evolution is negative. The hard colorless product is removed from the vessel and filtered and washed with toluene before being dried in a vacuum oven at 50° C. The product has a softening point of 80° C. The product is useful as a flame retardant.

EXAMPLE 8

The following Examples 8-14 follow the procedure of Example 1 as summarized below.

The equation and the reaction is as follows using 2% by wt. of picoline as a catalyst

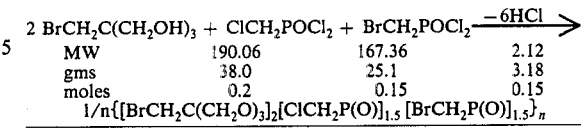

|  | $[(HOCH_2)_3CCH_2]O$ | + $POCl_3$ | + 1.5 $BrCH_2POCl_2$ $\xrightarrow{-6HCl}$ |
|---|---|---|---|
| MW | 254 | 153.4 | 212 |
| moles | 0.1 | 0.1 | 0.15 |
| gms | 25.4 | 30.6 | 31.8 |

$$1/n\{[(OCH_2)_3CCH_2OCH_2C(CH_2O)_3][P(O)][BrCH_2P(O)]_{1.5}\}_n$$

The product with $n$ about 20 is a white powder which begins melting at 240° C, and does not support combustion.

EXAMPLE 9

The equation for the reaction is shown below, with 1% by wt. of calcium chloride as a catalyst

|  | 2 $BrCH_2C(CH_2OH)_3$ | + $ClCH_2POCl_2$ | + $BrCH_2POCl_2$ $\xrightarrow{-6HCl}$ |
|---|---|---|---|
| MW | 190.06 | 167.36 | 2.12 |
| gms | 38.0 | 25.1 | 3.18 |
| moles | 0.2 | 0.15 | 0.15 |

$$1/n\{[BrCH_2C(CH_2O)_3]_2[ClCH_2P(O)]_{1.5}[BrCH_2P(O)]_{1.5}\}_n$$

The product has a melting point of 95° C and a degree of aggregation $n$ of about 5.

EXAMPLE 10

The three component ester employs the reactants shown below:

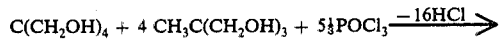

$$C(CH_2OH)_4 + 4 CH_3C(CH_2OH)_3 + 5\tfrac{1}{3}POCl_3 \xrightarrow{-16HCl}$$

-continued

| | | | |
|---|---|---|---|
| MW | 136.15 | 120.15 | 153.4 |
| moles | 0.05 | 0.2 | 0.267 |
| gms | 6.81 | 24.08 | 40.2 |
| | $1/n\{[C(CH_2O)_4][CH_3C(CH_2O)_3]_4[P(O)]_{5.33}\}_n$ | | |

The hard white product of $n$ about 15 has a melting point of 235° C and does not support combustion.

EXAMPLE 11

The preparation of a bromine containing phosphorus ester is shown in the present example which proceeds according to the equation shown below:

$$C(CH_2OH)_4 + \tfrac{2}{3} BrCH_2C(CH_2OH)_3 + 2POCl_3 \xrightarrow{-6HCl}$$

| | | | |
|---|---|---|---|
| MW | 136.15 | 190.06 | 153.3 |
| moles | 0.1 | 0.067 | 0.2 |
| gms | 13.6 | 19.8 | 30.6 |
| | $1/n\{[C(CH_2O)_4][BrCH_2C(CH_2O)_3]_{0.67}[P(O)]_2\}_n$ | | |

The product begins to soften at 110° C. The Oxygen Index for 10% by wt. in admixture with polyethylene terephthalate is 26.

EXAMPLE 12

A phosphorus ester is prepared in accordance with the reaction shown below:

$$C(CH_2OH)_4 + \tfrac{2}{3} CH_3C(CH_2OH)_3 + 2POCl_3 \xrightarrow{-6HCl}$$

| | | | |
|---|---|---|---|
| Moles | 0.2 | 0.133 | 0.4 |
| gms | 27.2 | 16.05 | 61.4 |
| MW | 136.15 | 120.15 | 153.4 |
| | $1/n\{[C(CH_2O)_4][CH_3C(CH_2O)_3]_{0.67}[P(O)]_2\}_n$ | | |

The white crystalline product has a melting point of 175° C and in a flame retardancy test with polyethylene terephthalate 10% by wt. has an Oxygen Index of 26.

EXAMPLE 13

An ester based upon 2 alcohol components and an acid component is prepared according to the reaction shown in the example below:

| | | | |
|---|---|---|---|
| | $4/5 C(CH_2OH)_4 + 4/15 CH_3C(CH_2OH)_3 + 1\text{-}1/3 POCl_3$ | | |
| MW | 136.15 | 120.15 | 153.4 |
| gms | 31.8 | 8.4 | 53.7 |
| moles | 0.233 | 0.07 | 0.35 | to give a product of the composition, where $n$ is about 80.

| $\{[C(CH_2O)_4]_{0.8}[CH_3C(CH_2O)_3]_{0.27}[P(O)]_{1.33}\}_n$ | |
|---|---|
| Melting Point | Oxygen Index |
| 130° C | 24 |

EXAMPLE 14

The three components shown below are reacted as follows

| | | | |
|---|---|---|---|
| | $POCl_3 + \tfrac{1}{2}CH_3POCl_2 + C(CH_2OH)_4 \xrightarrow{-4HCl}$ product | | |
| MW | 153.4 | 133.0 | 136.15 |
| gms | 30.7 | 13.3 | 27.3 |
| moles | 0.2 | 0.1 | 0.2 |

The composition of the product is $\{[C(CH_2O)_4][CH_3P(O)]_{0.5}[P(O)]\}_n$;

with $n$ of about 30, the product does not support combustion.

| Melting Point | Oxygen Index |
|---|---|
| 240° C | 25 |

EXAMPLE 15

This example shows trimethyl phosphite as an ester component on a phosphorus compound in the reaction below as a modification of Example 1.

$$2\,C(CH_2OH)_4 + 3(CH_3)_2C(CH_2OH)_2 + 4P(OCH_3)_3 \xrightarrow{-12CH_3OH}$$

| | | | |
|---|---|---|---|
| MW | 136.15 | 104 | 124.08 |
| gms | 27.2 | 20.8 | 49.7 |
| moles | 0.2 | 0.3 | 0.4 |
| | $1/n\{[C(CH_2O)_4][(CH_3)_2C(CH_2O)]_{1.5}[P]_2\}_n$ | | |

The product of $n$ about 10 does not support combustion.

EXAMPLE 16

The three components shown below are reacted as follows.

| | | | |
|---|---|---|---|
| | $3C(CH_2OH)_4 + 2\,POCl_3 + 3\,CH_3POCl_2 \rightarrow$ prod. $+$ 12 HCl | | |
| MW | 136.15 | 153.4 | 133.0 |
| gms | 40.8 | 30.7 | 39.9 |
| moles | 0.3 | 0.2 | 0.3 |

The esterification is conducted as described in Example 1, with the exception that no catalyst is used. The reaction proves much slower, requiring about a tenfold reaction time to completion. The product is $\{[C(CH_2O)_4]_3[P(O)]_2[CH_3P(O)]_3\}_n$ with $n$ the degree of aggregation about 15.

| Melting Point | Oxygen Index |
|---|---|
| 80 | 23 |

EXAMPLE 17

The use of a trivalent phosphorus compound is shown by the reaction of the three component system shown below:

| | | | |
|---|---|---|---|
| | $C(CH_2OH)_4 + 4\,CH_3C(CH_2OH)_3 + 5\tfrac{1}{3}\,PCl_3$ | | |
| MW | 136.15 | 120.15 | 137.4 |
| moles | 0.05 | 0.2 | 0.267 |
| gms | 6.81 | 24.08 | 36.69 |

The reaction is conducted as described in Example 1 with the evolution of 16 moles of HCl to give a product of the composition , $\{[C(CH_2O)_4][CH_3C(CH_2O)_3]_4[P]_{5.33}\}_n$ with $n$ about 50.

The product does not support combustion.

EXAMPLE 18

The three components shown below, including a tetrafunctional phosphorus reactant, bis(dichlorophosphonyl)methane

| | $CH_3C(CH_2OH)_3$ + | $\frac{1}{2}(CH_3)_2C(CH_2OH)_2$ + | $Cl_2(O)PCH_2P(O)Cl_2$ |
|---|---|---|---|
| MW | 120.15 | 104 | 250 |
| moles | 0.1 | 0.05 | 0.1 |
| gms | 12.0 | 5.0 | 25.0 | are reacted as described in Example 1 to give a product $\{[CH_3C(CH_2O)_3] [(CH_3)_2C(CH_2O)]_{0.5}$
$[(O)PCH_2P(O)]\}_n$, with $n$ about 20.

EXAMPLE 19

The three components shown below

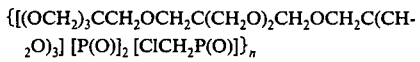

| | 2POCl$_3$ + | ClCH$_2$POCl$_3$ |
|---|---|---|
| MW | 372.4 | 153.4 | 167.2 |
| moles | 0.1 | 0.2 | 0.1 |
| gms | 37.2 | 30.7 | 16.7 | are reacted as described in Example 1 to give a product of the composition $\{[(OCH_2)_3CCH_2OCH_2C(CH_2O)_2CH_2OCH_2C(CH_2O)_3] [P(O)]_2 [ClCH_2P(O)]\}_n$ with $n$ about 2.

EXAMPLE 20

This example shows two sulfur compounds of phosphorus used with an oligomeric pentaerythritol starting material. The three components shown below

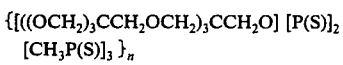

| | + 2PSCl$_3$ | + 2CH$_3$PSCl$_2$ |
|---|---|---|
| MW | 40.9 | 169.4 | 14.9 |
| moles | 0.1 | 0.2 | 0.2 |
| gms | 40.9 | 33.9 | 29.8 | are reacted as described in example 1 to give a product of the composition, with $n$ about 50.

$\{[((OCH_2)_3CCH_2OCH_2)_3CCH_2O] [P(S)]_2$
$[CH_3P(S)]_3 \}_n$

EXAMPLE 21

The three components shown below, including a monofunctional phosphorus reactant, dimethyl phosphinyl chloride,

| | $C(CH_2OH)_4$ + | $\frac{2}{3}POCl_3$ + | $2(CH_3)_2POCl$ |
|---|---|---|---|
| MW | 136.2 | 153.4 | 112.5 |
| moles | 0.1 | 0.67 | 0.2 |
| gms | 13.6 | 10.2 | 22.5 | are reacted as described in Example 1 to give a product of the composition $\{[C(CH_2O)_4] [P(O)]_{0.67} [(CH_3)_2P(O)]_2\}_n$ with $n$, the degree of aggregation, about 5.

EXAMPLE 22

The three components shown below, including methyl phosphorus bis(dimethylamide) as an amide component

| | $C(CH_2OH)_4$ + | $\frac{2}{3}CH_3C(CH_2OH)_3$ + | $3CH_3P(N(CH_3)_2)_2$ |
|---|---|---|---|
| MW | 136.2 | 120.2 | 134 |
| moles | 0.1 | 0.67 | 0.3 |
| gms | 13.6 | 8.0 | 40.2 | are reacted at 120°-150° until the stoichiometric amount of dimethylamine has been evolved. The resulting product has the composition $\{[C(CH_2O)_4] [CH_3C(CH_2O)_3]_{0.67} [CH_3P]_3\}_n$ with $n$ of about 5. The product does not support combustion.

EXAMPLE 23

The present ternary ester composition have a definite melting range, so that the ester can be added to a molten organic polymer such as ethylene terephthalate or a nylon. In contrast the binary ester of pentaerythritol and phosphoryl chloride, for example does not melt, and is therefore insoluble in the organic polymer. The ternary ester of Example 4, based upon 1 mole of pentaerythritol, 1/6 mole of phosphoryl chloride and 1.75 moles of methyl phosphonic dichloride has a melting range of 85° to about 150° C, so that the ternary ester is a useful additive flame retardant.

EXAMPLE 24

Another instance relative to the same binary ester as above, is the ternary ester of Example 12 based upon 1 mole of pentaerythritol, $\frac{2}{3}$ mole of trimethylol ethane, and 2 moles of phosphoryl chloride. This ternary ester has a melting range of 175°-230° C so that the stable flame-retardant additive readily melts with the organic polymer such as nylon 6,6.

What is claimed is:

1. The combination of an organic polymer together with 1-20 wt.% of a polymeric ester having as moieties thereof, (A) an aliphatic alcoholic moiety of an alcoholic reactant of 5 to 20 carbon atoms, and from 2 to 6 hydroxyl functional groups, with the proviso that there is no hydrogen atom on the carbon atoms beta to the hydroxyl oxygen, (B) a moiety of a phosphorus-containing acid halide, ester or amide reactant of 0 to 20 carbon atoms having from 1 to 4 functional groups, and (C) a different alcoholic moiety as defined in (A) or a different phosphorus-containing moiety defined in (B), the said ester having a degree of aggregation of 2 to 100, and with each of (A), (B) and (C) being present at from 1 mole to 99 mole %, with the proviso that the number of alcoholic functional groups on the alcoholic reactants is equal to the number of the said functional groups on the phosphorus-containing reactants.

2. The combination of polyethylene terephthalate together with 1-20 wt.% of a polymeric ester having as moieties thereof, (A) an aliphatic alcoholic moiety of an alcoholic reactant of 5 to 20 carbon atoms, and from 2 to 6 hydroxyl functional groups, with the proviso hat there is no hydrogen atom on the carbon atoms beta to the hydroxyl oxygen, (B) a moiety of a phosphorus-containing acid halide, ester or amide reactant of 0 to 20 carbon atoms having from 1 to 4 functional groups, and (C) a different alcoholic moiety as defined in (A) or a different phosphorus-containing moiety defined in (B), the said ester having a degree of aggregation of 2 to 100, and with each of (A), (B) and (C) being present at from 1 mole to 99 mole %, with the proviso that the number of alcoholic functional groups on the alcoholic reactants is equal to the number of the said functional groups on the phosphorus-containing reactants.

* * * * *